United States Patent Office 3,065,283
Patented Nov. 20, 1962

3,065,283
OXIDATIVE COUPLING OF AN ACETYLENE HYDROCARBON
John Happel, Yonkers, and Charles J. Marsel, New York, N.Y. (both % New York University, 233 Fordham Landing Road, University Heights 68, N.Y.)
No Drawing. Filed Apr. 23, 1958, Ser. No. 730,268
4 Claims. (Cl. 260—678)

This invention relates broadly to an improved and safer process for carrying out certain chemical reactions using acetylenic compounds and more specifically, relates to an improved process for handling and reacting compounds having triple bonds.

Reactions involving the so-called "oxidative coupling" of acetylenic compounds and derivatives thereof have been known and described in the chemical literature. Among the first of these is a reaction described by Glaser, Ber. 2, 422–4 (1869) in which phenylacetylene was subjected to oxidative coupling under reaction conditions which included carrying out the reactions in the presence of ammonia and ethanol and at temperatures of 20–25° C. The results obtained indicate that the yields isolated therefrom were relatively low and that the reaction was somewhat lacking in control. Since this early period, numerous other acetylenic compounds have been used in similar reactions to prepare various products thereof, including conjugated diacetylenes and derivatives. These reactions have involved a variety of reaction conditions using the basic reaction. In each case, the results so obtained have been somewhat less than completely satisfactory since the yields of desired products are low with resulting loss of starting reactants and by-product formation. Also, the rates of the reaction are erratic and somewhat uncontrollable and frequently involve hazardous situations.

In spite of the above outlined disadvantages in carrying out oxidative coupling reactions involving reactants and products having acetylene bonds, it has consistently been found that this general reaction is one of the best ways to prepare compounds of this type. However, the reactions have been more or less hazardous and difficult to control and have been avoided to a considerable extent because of their inherent difficulties. In fact, even on relatively small scale operations, as for example, in the preparation of one or two pound batches of materials, serious explosions and fires have frequently resulted. Thus, it has been substantially impossible to operate on a large scale, or even on a semi-commercial type plant, the reaction being unsafe even in laboratory size equipment.

It has now been discovered that it is entirely possible to operate these oxidative couplings safely and in a controlled manner and on large scale to make commercial operations feasible. The surprising discovery has been made that these oxidative coupling reactions can be accomplished in the presence of relatively large amounts of a water-insoluble, inert organic liquid diluent, which appears to decrease the sensitivity of the reactants and of the products formed. In a general way, the reaction which is facilitated by the practice of this invention is the conversion of a water solution or suspension of a metallic salt of an acetylenic compound or derivative thereof to a diacetylene by means of a suitable oxidizing agent. More specifically, and as a typical example of such a reaction, the conversion is carried out by the contact of an organic compound containing a terminal acetylene group capable of undergoing the coupling reaction, with a cuprous ammonium chloride slurry and coupling of the resulting cuprous salt by contact with oxygen.

The basic reaction can be formulated for a large variety of acetylenic compounds and derivatives, including all of those having a terminal acetylenic group present, for example:

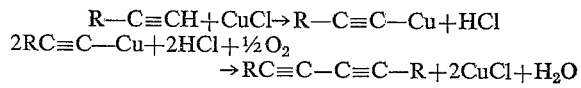

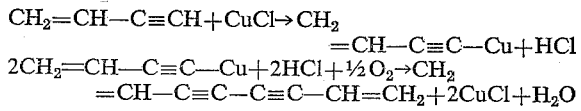

As a more specific example, the reaction involving the coupling of vinyl acetylene with itself by the oxidation of the cuprous salt which is formed in a cuprous ammonia chloride slurry in water is illustrated as follows:

$CH_2=CH—C\equiv CH+CuCl \rightarrow CH_2=CH—C\equiv C—Cu+HCl$
$2CH_2=CH—C\equiv C—Cu+2HCl+\frac{1}{2}O_2 \rightarrow CH_2=CH—C\equiv C—C\equiv C—CH=CH_2+2CuCl+H_2O$ The improved process of this invention, wherein by the selective use of various diluents in the reaction zone, and by the control of the reaction conditions, and whereby the reactions proceed in a more controlled and selective manner and with the hazards substantially eliminated, can be applied and adapted to the class of acetylenic compounds containing at least one acetylene bond and at least one of which is a terminal acetylene bond, that is, one which is capable of undergoing and facilitating a coupling reaction. The various types of compounds and derivatives which are capable of undergoing such reaction and are applicable as starting reactants to the improved process include acetylene hydrocarbons such as the alkynes, the enynes, the diynes, the acetylene alcohols, the acetylene epoxides, the acetylene acids, and acetylene compounds which are capable of undergoing mixed couplings, as, for example, an alkyne with an acetylene alcohol. Examples of these types of coupling reactions are shown below in typical equations.

(1) Hydrocarbons
 (a) Enynes

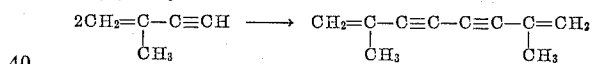

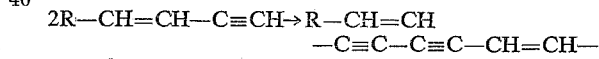

(b) Diynes

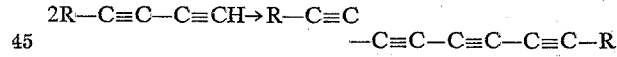

In the above equations R can be an alkyl group having from one to twenty carbon atoms or it can be an arylalkyl group having from one to twenty carbon atoms. For example, R can be methyl, ethyl, propyl, isopropyl, n-propyl, butyl, isobutyl, amyl, hexyl, heptyl, octyl, nonyl, cyclopropyl, cyclohexyl, and the like, and it can be benzyl, phenyl ethyl, phenyl propyl, naphthyl methyl, naphthyl ethyl and the like. It can also be (2) Alcohols $2HOCH_2C\equiv CH \rightarrow HOCH_2C\equiv C—C\equiv C—CH_2OH$
$2HOCH_2—CH=CH—C\equiv CH \rightarrow HOCH_2—CH=CH—C\equiv C—C\equiv C—CH=CH—CH_2OH$

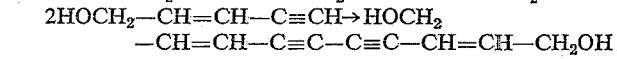

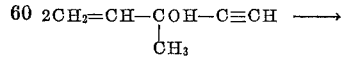 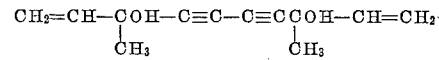

(3) Epoxides

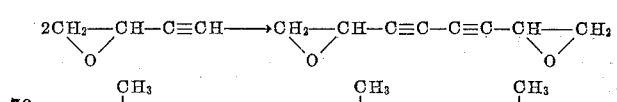

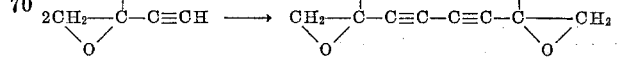

(4) Acids $$2HOOC-C\equiv CH \rightarrow HOOC-C\equiv C-C\equiv C-COOH$$
$$2HOOC-CH=CH-C\equiv CH \rightarrow HOOC$$
$$-CH=C=C-C\equiv C-CH=CH-COOH$$

(5) Mixed couplings

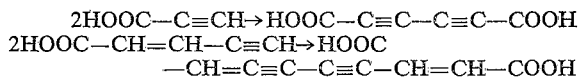

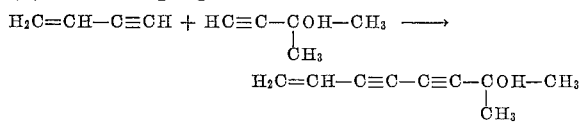

Thus it is seen that the improved process is applicable to many and varied kinds of compounds, and preferably, it has great use in oxidative coupling reactions in which acetylene compounds used have additional unsaturation, such as an additional acetylene bond, or one or more olefin bonds. This is true, because these materials have been found to have higher impact sensitivity and cannot normally be handled in great concentrations or in very large amounts, and produce quite readily uncontrollable conditions when undergoing reaction. The following illustration shows how such an explosion can occur:

A mixture of 400 g. of CuCl (4 moles) and 640 g. of $NH_4Cl$ (12 moles) was added to 1700 ml. of water. The suspension was heated to 40° C. and a total of 40 ml. of vinylacetylene was added. Oxygen was then passed through the solution for 35 minutes. The passage of oxygen was interrupted and 25 ml. of vinylacetylene was added. Shortly after the introduction of oxygen was resumed, a violent explosion took place.

These coupling reactions are usually carried out with a metallic salt of the acetylene compound, the metal atom being associated with or replacing the somewhat acidic hydrogen atom attached to the carbon atom of the terminal acetylene bond. The salts which are used thus are mainly formed either as a separate step or in situ in the coupling reaction mixture and are usually formed in an aqueous medium. The salts most used are the copper salts, preferably in the cuprous state, the silver salts, the cadmium salts, the mercury salts, and the like. It is also preferable to have present during the salt formation step some ammonia or some ammonium salt as for example, ammonium chloride or ammonium sulfate or ammonium acetate.

Formation of the salts in situ for the reaction is preferred, since this avoids the isolation, purification and recovery of the unstable acetylene salts. The salt formation step may be carried out in the presence of the inert, water insoluble diluent, if desired, and the subsequent oxidative coupling carried out directly thereon. There is nothing unduly critical about the temperature of the salt formation or the oxidative coupling except that they should be done at the lowest feasible and operative temperatures which give a practical reaction rate and are compatible with the products and reactions. Temperatures of 0° C. and below down to −70° C. can be used and up to 100° C. Temperatures of over 150° C. are in general to be avoided in these reactions.

The oxidative coupling is carried out by contacting the acetylene compound or compounds with an oxidizing agent. Passing oxygen or air through the reaction mixture containing the acetylene salt has been found to work entirely satisfactorily. Also there may be used peroxides such as tertiary butyl peroxide, hydrogen peroxide, benzoyl peroxide, sodium peroxide, manganese dioxide; the persulfates, such as potassium persulfate, and other oxidizing agents such as potassium permanganate, chromic acid, potassium dichromate, potassium perchlorate, and the like.

While the inert diluent which is selected for the particular reaction to be carried out is not unduly critical, it must be substantially water immiscible and must be inert both to the reactants, and to the products formed as a result of the coupling reaction. It should not freeze at the temperature during the reaction. It should not be volatile at the reaction temperatures since it is preferable not to use pressure, if possible. Typical diluents which may be used are benzene, toluene, the xylenes; chlorinated hydrocarbons such as chloroform or carbon tetrachloride; petroleum naphtha fractions; aliphatic hydrocarbons such as hexane or heptane; Decalin and Tetralin; ethers such as Carbitol or Cellosolve and the like. The preferred class of diluents are those of the aromatic hydrocarbon type. The amount of diluent is not critical although the ratio to total reaction solution or slurry should be at least one to fifty.

The reaction may be carried out on a batchwise scale, or most conveniently on a large scale in a continuous manner. When carried out in this controlled manner, the products are readily purified by conventional means such as distillation, filtration, or crystallization, and they may be further purified in any known manner. Frequently, purification is now necessary since the products produced in this improved process are relatively pure and free from by-products.

These compounds have many uses. For example they may be used as high energy fuels in bipropellant rocket engines or air breathing jet engines. They may be polymerized to form drying oils or plastic compositions. They may be used as drugs, antibiotics and fungicides.

The invention will be further described and illustrated by the examples below, although it is in no way intended to limit the invention in any way thereto.

EXAMPLE 1

*Preparation of Divinyl Diacetylene*

A mixture of 3 parts of cuprous chloride, 9 parts of ammonium chloride and 30 parts of water is cooled to 0° C. Into this mixture, a cold solution of 2 to 3 parts of vinylacetylene in 1 to 2 parts of toluene is passed intermittently over a period of from 4 to 5 hours while simultaneously stirring and bubbling oxygen through the reaction mixture at a steady rate. The reaction temperature is permitted to gradually rise to room temperature during this period. At this point, the reaction mixture consists of a dark blue water layer and a yellow organic layer.

As a control device, the refractive index of the organic layer is periodically checked. When the refractive index reaches a value of 1.55–1.56, the organic layer is separated off, since further reaction would result in a partial precipitation of copper salts. The catalyst solution can be reused if desired by further addition of vinylacetylene and the toluene solution as previously. The divinyldiacetylene product can be isolated, if desired, by vacuum distillation with a boiling point of 40° C./5 mm. $n_D^{20}$ 1.6080. This distillation is best carried out using a nitrogen bleed with the addition of an inhibitor such as tertiary butyl catechol to the pot to prevent excessive polymerization of the product. As a further precaution, the pot temperature is not allowed to rise above 70° C. Yields range from 50–60% of the purified product.

Carried out in this manner, batches of product up to 50 pounds can be prepared quite safely and conveniently in this manner. Continuous operations can be carried out indefinitely with incident.

EXAMPLE 2

*Mixed Coupling Reaction*

A mixture of 20 parts of cuprous chloride, 32 parts of ammonium chloride and 100 parts of water is heated with stirring to 50° C. With oxygen bubbling in continuously, a mixture of 11 parts of 2-methyl-3-butyn-2-ol, 9 parts of vinylacetylene and 5 parts of diethyl ether, is gradually added over a period of 6 hours. Oxygen bubbling is continued for an additional 3 hours, followed by an extraction with ether. The ether is removed under vacuum and the remaining liquid treated with petroleum ether. This results in precipitation of any of the glycol, 2,7-dimethyl-3,5-octadiyne-2,7-diol, which may be formed in a side reaction. The remaining liquid is separated by fractional distillation under vacuum, giving if present as a side product, any divinyldiacetylene. The main product, that produced by the mixed coupling, 2-methyl-7-octen-3,5-diyn-2-ol, boiling point 59–62° C./0.4 mm., is obtained. Yields range from 40–55%.

EXAMPLE 3

*Oxidative Coupling of 3-Methyl-1-Hexen-4-Yn-3-Ol*

A mixture of 2 parts of cuprous chloride, 3 parts of ammonium chloride, 8 parts of water, and 1 part of concentrated aqueous ammonia, is heated with stirring to 45° C. One part of so-called 3-pentol(3-methyl-1-hexen-4-yn-3-ol) and one part of benzene is gradually added over a period of ½ hour with simultaneous bubbling, which is then continued for an additional hour. A reaction temperature of which 50° C. was maintained. The reaction mixture was then repeatedly extracted with ether. Removal of the ether and benzene under vacuum gives a viscous liquid which crystallizes on standing. The yield of the desired glycol coupling product is 90%. Recrystallization is accomplished from a benzene-petroleum ether mixture giving a yellow crystalline solid, melting point 51.5–53.5° C.

EXAMPLE 4

*Preparation of Dimethyl Divinyl Diacetylene*

A mixture of 5 parts of cuprous chloride, 8 parts of ammonium chloride and 20 parts of water is heated to 50° C. with stirring. Then while oxygen is bubbled continuously, one part of benzene in 5 parts of methyl vinyl acetylene is added gradually over a period of 4 hours. Passing of oxygen through the mixture is continued for an additional hour and the reaction mixture is then extracted with ether.

Subsequent vacuum distillation gives dimethyl divinyl diacetylene, boiling point 42° C./1 mm. in 90% yield.

EXAMPLE 5

*Preparation of Dimethyl Diacetylene*

A mixture of 5 parts of cuprous chloride, 8 parts of ammonium chloride and 20 parts of water is heated with stirring to 40° C. One part of hexene is then added and a total of one part of methylacetylene gas is passed into the mixture intermittently over a period of several hours. In addition, oxygen is passed into the reaction mixture and is continued for one hour after methylacetylene addition is completed. Extraction with ether followed by removal of solvent under vacuum yields the crystalline solid, dimethyl diacetylene in high purity. yields range from 50 to 60%.

What is claimed is:

1. A process for oxidative coupling which comprises subjecting and acetylene hydrocarbon having a terminal acetylene group to selective oxidative coupling in aqueous solution in the presence of a metallic salt selected from the group consisting of copper salts, silver salts, cadmium salts, and mercury salts, and capable of forming a salt therewith and oxygen, said oxidative coupling being carried out in the presence of an inert, liquid, water-immiscible organic aromatic hydrocarbon compound as the sole organic diluent said diluent being present in a ratio of at least one part to 50 parts of total reaction mixture, whereby said acetylene hydrocarbon undergoes oxidative coupling.

2. The process of claim 1 in which the acetylenic hydrocarbon is vinyl acetylene.

3. The process of claim 1 in which the acetylenic hydrocarbon is methyl acetylene.

4. The process of claim 1 in which the acetylenic hydrocarbon is methyl vinyl acetylene.

References Cited in the file of this patent

UNITED STATES PATENTS

| | | |
|---|---|---|
| 1,896,162 | Carter et al. | Feb. 7, 1933 |
| 1,926,039 | Downing et al. | Sept. 12, 1933 |
| 2,796,442 | Franke et al. | June 18, 1957 |
| 2,942,014 | Cameron | June 21, 1960 |

OTHER REFERENCES

Johnson, Acetylenic Compounds, vol. I, p. 229 (1946).

Jones et al., J. Chem. Soc. (London), 1954, pp. 3212–3217.

Jones et al., Chem. Abstracts, vol. 50, p. 157 (1956).